United States Patent [19]

Engelmore et al.

[11] E Patent Number: Re. 32,805

[45] Reissued Date of Patent: Dec. 20, 1988

[54] ROTATABLE ELECTRICAL CONNECTOR FOR COILED TELEPHONE CORD

[76] Inventors: Anthony R. Engelmore, 14 Greenway Dr., Mechanicsburg, Pa. 10755; William H. Nold, 7829 Wolf Pen Branch Rd., Prospect, Ky. 40059

[21] Appl. No.: 933,560

[22] Filed: Nov. 18, 1986

Related U.S. Patent Documents

Reissue of:

[64] Patent No.: 4,583,797
Issued: Apr. 22, 1986
Appl. No.: 743,500
Filed: Jun. 11, 1985

[51] Int. Cl.[4] ..... H01R 35/00

[52] U.S. Cl. ..... 439/26; 439/24; 439/676

[58] Field of Search ..... 439/676, 13, 17–20, 439/23–30

[56] References Cited

U.S. PATENT DOCUMENTS

| | | | |
|---|---|---|---|
| 2,288,259 | 6/1942 | Gladulich | 339/8 P |
| 2,414,957 | 1/1947 | Larrabures | 339/8 PB |
| 3,216,262 | 11/1965 | Swarts et al. | 439/28 X |
| 3,550,061 | 12/1970 | Sukup | 439/26 |
| 3,601,747 | 8/1971 | Wayne et al. | 439/26 |
| 3,957,331 | 5/1976 | Tantillo et al. | 339/8 R X |
| 4,472,010 | 9/1984 | Parnello | 339/8 R |
| 4,533,796 | 8/1985 | Engelmore | 439/20 |
| 4,590,337 | 5/1986 | Engelmore | 179/186 |

*Primary Examiner*—Eugene F. Desmond
*Attorney, Agent, or Firm*—Shlesinger, Arkwright & Garvey

[57] ABSTRACT

The low friction rotatable electrical connector is for use with a coiled telephone cord to prevent the cord from becoming twisted or tangled during use. This connector is generally of insulating material formed with a hollow housing for supporting a rotor assembly therein. This rotor assembly is a hollow cylinder that is positioned within the housing for relative rotation therein. One end wall of the housing has a circular opening in which one end of the rotor assembly is supported for rotation. The rotor assembly has a single longitudinal split for nearly the entire length thereof, but the split does not include the journal at one end that is located within the circular opening or bearing in the end wall of the housing. The rotor assembly supports a plurality of continuous conductive rings on the exterior thereof, and there is an insulating washer positioned between each pair of conductive rings to serve as a spacer between adjacent rings. Each conductive ring includes a separate insulated conductor on the underside that extends through the split in the rotor. There are several modifications of this invention, but each modification includes a plurality of spring wire contact elements mounted within the housing in a parallel array, where each wire contact element has a portion biased into continuous wiping contact with one of the continuous conductive rings for making a reliable electrical connection. The housing includes partitions interposed between the wire contact elements so as to stabilize and space them apart.

46 Claims, 4 Drawing Sheets

FIG. 1
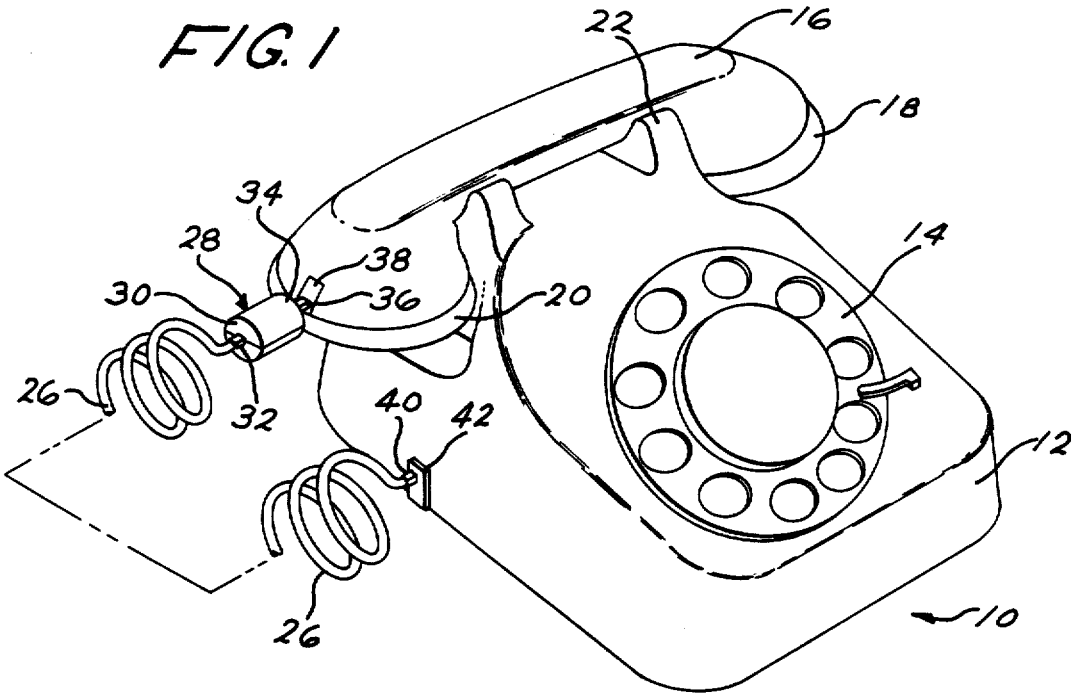
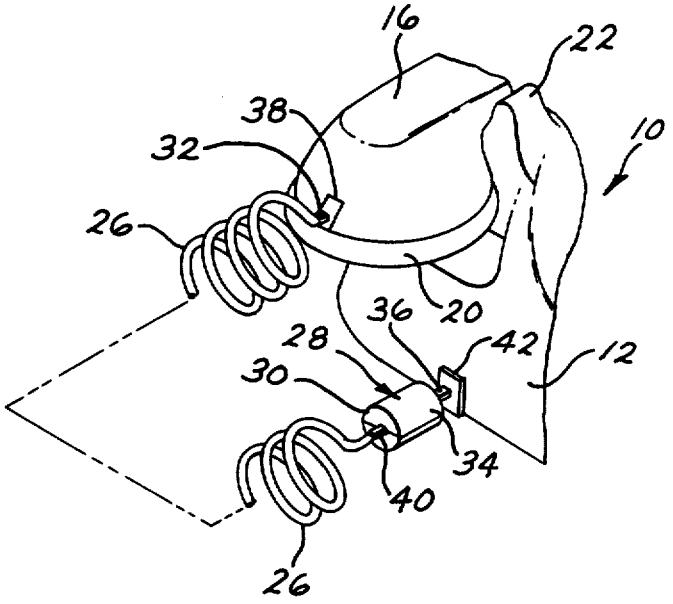
FIG. 2
FIG. 3
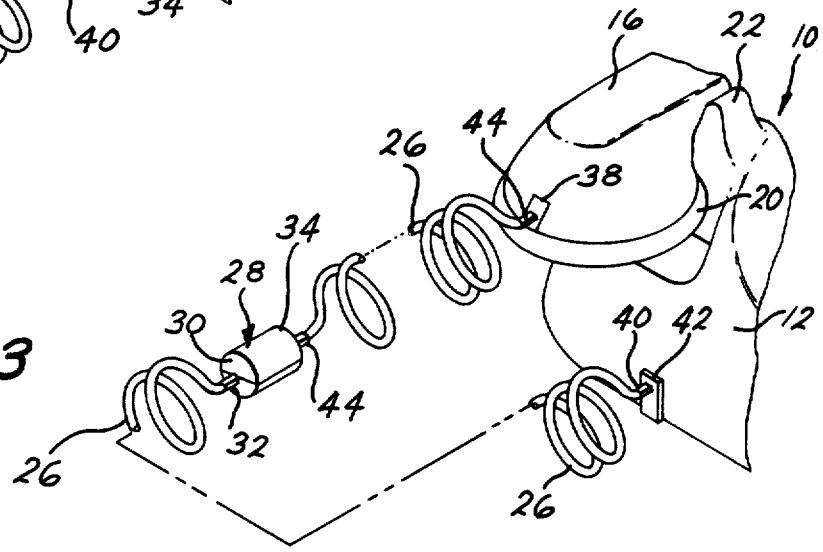

ROTATABLE ELECTRICAL CONNECTOR FOR COILED TELEPHONE CORD

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to the art of rotatable electrical connectors for use with flexible electric cables, and particularly for use with coiled cords that are widely used today on telephone receiver for connecting the handset to the telephone base. One of the advantages of coiled telephone cords is that they are able to stretch for convenient use, while they retract into a compact length when not in use. This rotatable connector of the present invention is mainly for use with lightweight, light-duty telephone cords rather than high voltage, high current electrical cable system.

2. Description of the Prior Art

A thorough search of the prior art was made, and only one patent was found relating to rotatable electrical connectors for the cords of telephone receivers. Most, if not all, of the prior art described heavy-duty commercial or industrial electrical connectors.

The Larrabure U.S. Pat. No. 2,414,957 describes a swivel connector for electric cables and cords for electric lamps, irons, vacuum cleaners and telephone sets. One end of the connector comprises a turning head that is shown fixed to a telephone handset. The main connector body has a closed end and a central socket or bore. The turning head has a ball bearing raceway with contacts with the adjacent rim portion of the body. The internal electrical conductors comprise a central rod and two concentric insulated tubes, with a grooved roller on the innermost end of each conductor. The main body has a plurality of radial, spring-biased ball contacts, each cooperating with a grooved roller. These spring-biased ball contacts are each provided with a wire conductor external of the main body, and cooperating with a tubular loop member.

The Mohr U.S. Pat. No. 3,195,094 relates to an electric cable coupling comprising mutually concentric, rotatable units that are capable of transmitting electrical current therethrough. Each electrical circuit has an internal ring member surrounded by a plurality of cylindrical rollers which are confined by an external ring member, and this unit is held together by split rings or helical springs. This design appears to have an excessive amount of friction to restrain an easy turning action between the movable parts.

The Norwegian Pat. No. 106,382, issued in 1965, appears to be derived from the above-cited Mohr patent, or vice versa.

The German Pat. No. 1,152,459 describes a cable connector with mutually concentric and rotatable parts for poly-phase current in which a series of ball bearings is provided inside an insulating housing. These ball bearings are under spring pressure, and they carry the electrical current. An internal tube is provided which holds a compact bundle of conductors that reach inside the insulating housing. The number of conductors corresponds to the number of electrical phases.

The Wendell et al. U.S. Pat. No. 3,599,165 describes an electrical coupling device providing a series of continuous, unbroken, unsliding electrical connections between two relatively rotatable members over a limited angular displacement. There is a spiral strip connector that is made of thin material having a relatively low spring constant, that is capable of cyclic operation for a sufficient large number of rotative displacements as desired without excessive fatique and rupture.

The Hayward et al., U.S. Pat. No. 3,847,463 describes a cable connector for electrically connecting a coaxial cable to a fixed device, such as a coupler or amplifier, for use in a cable antenna television system CATV which is adapted to accommodate drop leads to individual subscribers' television sets.

The Charles et al. U.S. Pat. No. 3,972,577 describes rotating electrical contacts in a device that is intended to be used on apparatus submerged underwater at great depth where it would be subjected to a high hydrostatic pressure. One example of such a device would be a rotary antenna of panoramic sonars intended to operate at great depth. This device also must be water-tight. This patent uses mercury or an alloy of gallium and indium as the conductive liquid.

The British Pat. No. 331,997 describes swivel connections for electric cables using ball bearing rings. One metal ring has spring wipe contacts that are adapted to press lightly on the face of the opposite ring and provide continuous electric contact therebetween. Apparently, the ball race is not an electrical conductor. There is a ball and socket joint between the spindle of one member and the spindle of opposite member.

OBJECTS OF THE PRESENT INVENTION

The principal object of the present invention is to provide a low friction rotatable electrical connector for use with coiled telephone cords without requiring ball bearings for rotation or electrical continuity.

A further object of the present invention is to provide a rotatable connector of the class described having a longitudinally split hollow housing having a circular opening at one end for receiving the journal of a rotor assembly for rotation with the housing, where the rotor assembly includes a plurality of continuous conductive rings spaced along the length of the rotor assembly, while the housing supports a parallel array of spring wire contact elements for cooperation with the conductive rings for maintaining electrical continuity through the connector at all times.

A further object of the present invention is to provide a rotatable electrical connector of the class described where the housing includes a series of parallel partitions for stabilizing and spacing the spring wire contact elements that are mounted within the housing for cooperation with the conductive rings of the rotor assembly.

A further object of the present invention is to provide a rotatable electrical connector of the class described with the female electrical socket built into one end of the connector housing, and a male phone plug assembled to the journal-end of the rotor assembly.

A further object of the present invention is to provide a rotatable electrical connector of the class described with a circuit board clampd with the split housing for supporting the spring wire contact elements that make a continuous wiping contact with the plurality of continuous conductive rings that are mounted on the rotor assembly, as well as supporting a second plurality of spring wire contact elements that serve as terminal means of the female socket for receiving a male phone plug.

A still further object of the present invention is to provide a rotatable electrical connector of the class described where the plurality of spring wire contact elements for engaging the continuous conductive rings of the rotor assembly are molded into one-half of the split housing and are provided with a series of parallel terminal ends extending from one side of the housing.

SUMMARY OF THE INVENTION

The present invention provides a low friction rotatable electrical connector for use with coiled telephone cords, where the connector has a hollow housing with a circular opening in at least one end wall thereof for supporting the journal at one end of a rotor assembly that is positioned within the housing. The rotor assembly is a hollow cylindrical member having a single longitudinal split for nearly the entire length thereof, except for the journal at one end thereof. A plurality of continuous conductive rings are mounted along the length of the rotor assembly and are spaced apart by an insulating washer between each pair of rings, where each ring has a separate insulated conductor on the underside thereof, where the conductors extend through the journal and terminate in a male phone plug. A plurality of spring wire contact elements are mounted within the housing in a parallel array, where each wire contact element makes continuous wiping contact with one of the continuous conductive rings. Each wire contact element being of hairpin shape. The connector housing has partitions interposed between the wire contact elements so as to stabilize and space them apart.

BRIEF DESCRIPTION OF THE DRAWINGS

This invention will be better understood from the following description taken in conjunction with the accompanying drawings, and its scope will be pointed out in the appended claims.

FIG. 1 is a top perspective view of standard telephone set provided with a coiled telephone cord extending between the base and the handset, where the low friction rotatable electrical connector of the present invention is interposed between the upper end of the coiled telephone cord and the handset.

FIG. 2 is a fragmentary perspective view, similar to the left side of FIG. 1, showing the rotatable electrical connector of the present invention mounted on the lower end of the coiled cord and plugged into the base of the telephone set, rather than plugged into the handset.

FIG. 3 is a fragmentary perspective view, similar to that of FIG. 2, showing the rotatable electrical connector of the present invention mounted intermediate the length of the telephone cord.

DESCRIPTION OF THE PREFERRED EMBODIMENTS

Figure 4:
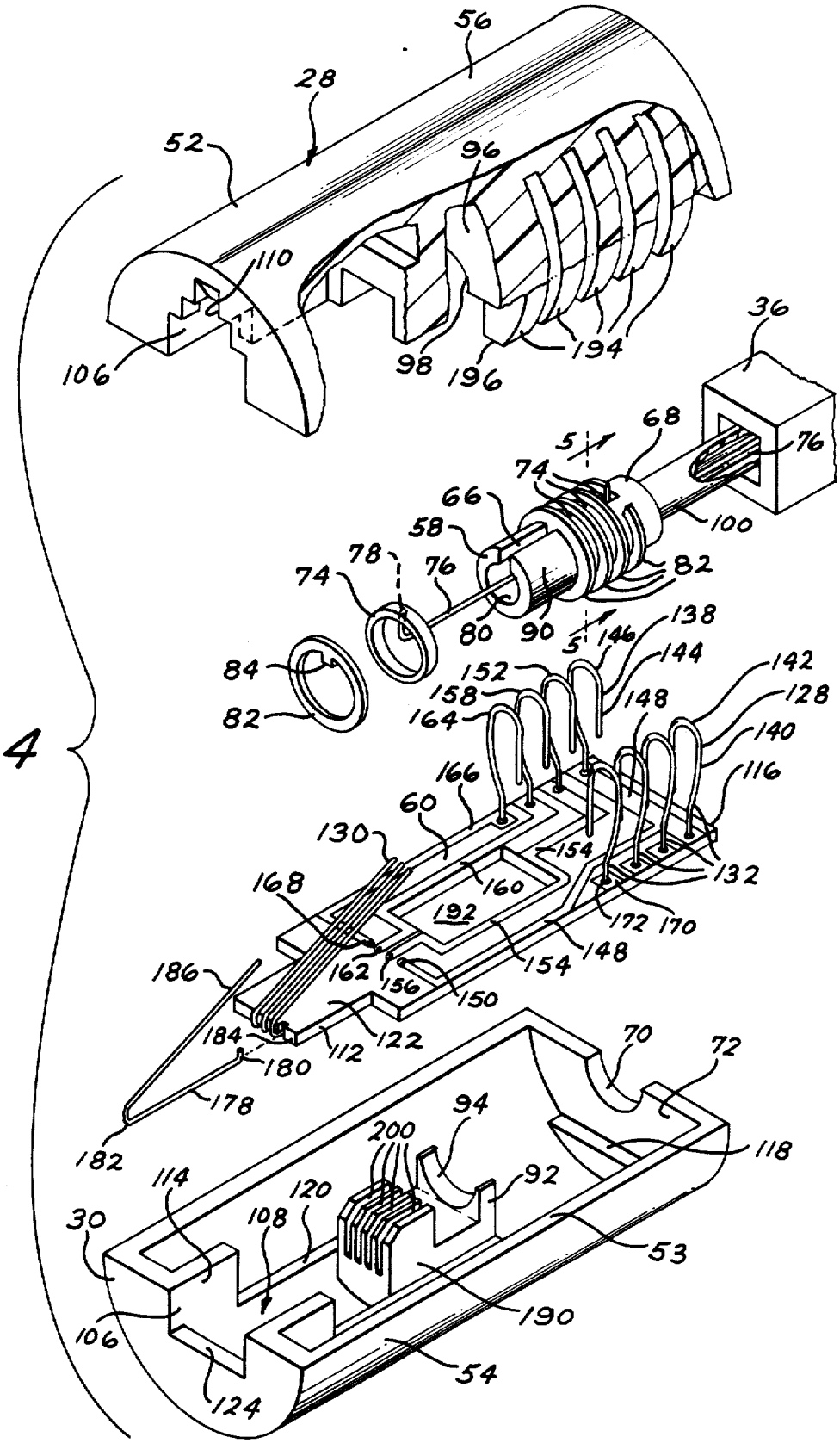
FIG. 4 is an exploded perspective view, on an enlarged scale, showing the low friction rotatable electrical connector of the present invention separated into its individual parts and arranged in the manner in which they are joined together. The hollow housing is split longitudinally into two parts; namely, the top cover that is illustrated at the top of the Figure, and the base member that is shown at the bottom of the Figure. Illustrated below the cover is the rotor assembly, where one of the continuous conductive rings is shown separated from the hollow cylindrical rotor. Also separated from the rotor is shown one of the insulated washers for spacing the rings from each other. Illustrated beneath the rotor assembly is a circuit board shown supporting a plurality of opposing spring wire contact elements at the right end and a plurality of closely spaced, parallel spring wire contact elements at the left end to serve as terminal means for the female socket at the left end of the connector.

Turning now to a consideration of the drawings, and, in particular, to the top perspective view of FIG. 1, there is shown a typical example of a telephone set 10 as for use on a table or desk top. This telephone set 10 has a base 12 which includes the dialing mechanism 14. Separate from the base is a handset 16 which, of course, has the earpiece 18 at one end and a microphone 20 at the opposite end. This handset 16 is shown resting in a cradle 22 when it is not in use. Of course, this is only one configuration of a standard telephone set, and it is well recognized that there are many variations of this configuration and that the number of such configurations are growing rapidly. However, most telephone sets have the relationship of a fixed base element and a movable handset. The handset 16 is joined electrically to the base 12 by means of a coiled telephone cord 26, as is conventional in this art. Such coiled cords 26 are capable of stretching to several times their normal length for the convenience of the user in moving the handset 16 away from the base unit 12. One frequently heard complaint in the use of coiled telephone cords, such as 26, is that they become twisted and tangled during normal use until they reach a condition where they will not expand or stretch as originally designed, and then such cords become an annoyance rather than a convenience.

The present invention relates to the discovery of several modifications of a low friction rotatable electrical connector 28 for cooperation with the coiled telephone cord 26 to ensure that the movement of the handset 16 away from the base 12 will not cause a kink or twist to occur in the coiled cord. In FIG. 1, the rotatable electrical connector 28 is connected at its left end 30 to a standard male phone plug 32 that is formed at the upper end of the coiled cord 26. The right end 34 of the connector 28 is fitted with a standard male phone plug 36 which is mounted into a standard female receptacle 38 built into the microphone end 20 of the handset 16. Notice that the lower end of the coiled cord 26 is also fitted with a standard male phone plug 40 which connects into a standard female receptacle 42.

Before going into a detailed description of the construction of this rotatable electrical connector 28, mention will be made of other possible locations for use of this connector, starting with FIG. 2. The elements shown in FIG. 2 that are common to the elements in FIG. 1 will be given the same reference numerals. In the modification of FIG. 2, the rotatable electrical connector 28 has its standard male phone plug 36 at its right end 34 connected into the standard female receptacle 42 in the base 12 of the phone. The left end 30 of the connector receives a standard male phone plug 40 supported on the lower end of the coiled cord 26. Notice, the upper end of the cord 26 has its standard male phone plug 32 connected into the standard female receptacle 38 that is built into the microphone 20 of the handset 16. Thus, in summary, in FIG. 1, the connector 28 is connected into the handset 16, while in FIG. 2 the connector 28 is connected into the base 12.

In the third modification of FIG. 3, the rotatable electrical connector 28 of the present invention is shown mounted intermediate the length of the telephone cord 26. Another way of saying this is that a length of coiled cord 26 is interposed between the rotatable connector 28 and the female receptacle 38 in the microphone 20 of the handset 16. This added length of coiled cord between the connector and the handset could either be furnished with a male phone plug 44 at each end, but the right end 34 of the connector would have to be furnished with a female socket for receiving the mating phone plug. Another alternative would be to have the left end of the cord that fits into the right end 34 of the connector 28 in FIG. 3 connected permanently to the connector as original equipment furnished by the factory.

Figure 8:
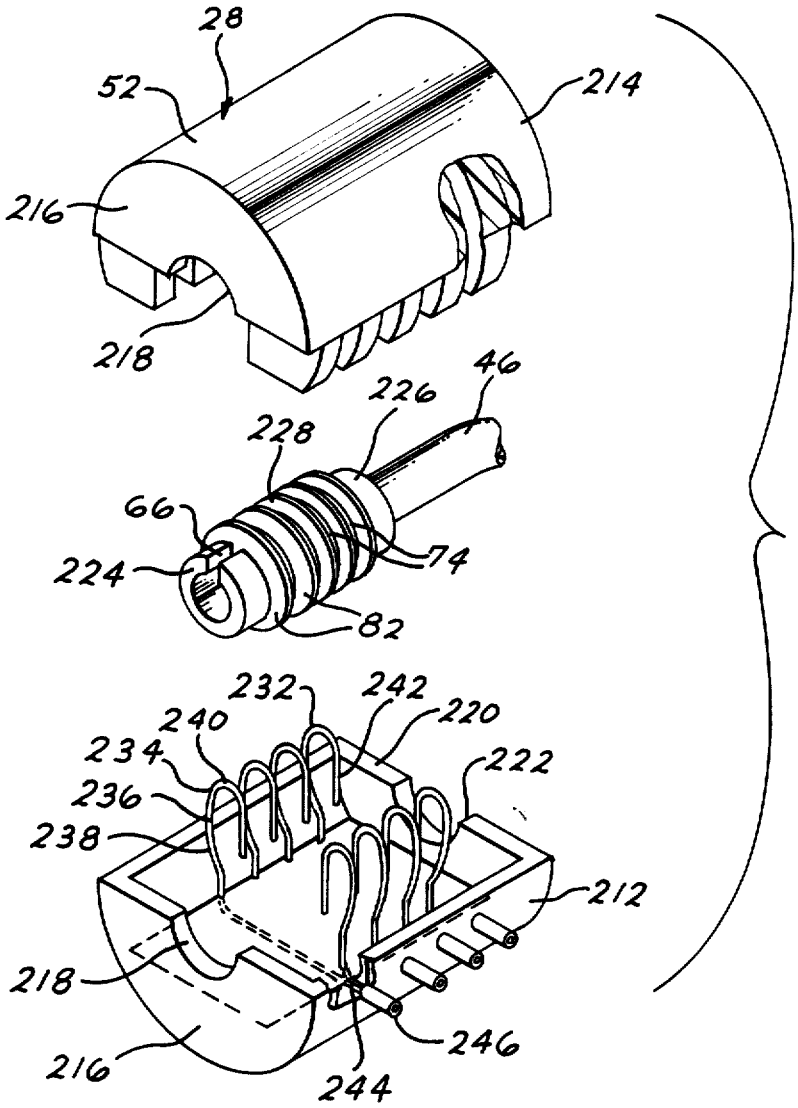
FIG. 8 is an exploded perspective view of another modification of the present invention which is related to the rotatable electrical connector of FIG. 7 which is built into the handset. The circuit board has been eliminated by mounting the plurality of spring wire contact elements directly to the base of the housing at the same time the base is molded of insulating material.
Figure 7:
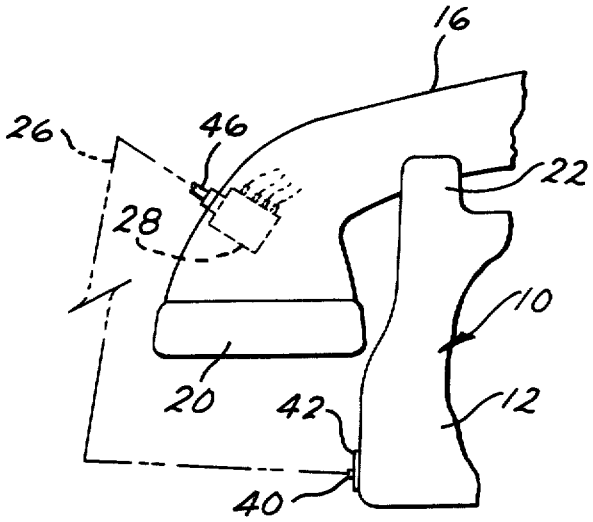
FIG. 7 is a fragmentary front elevational view of the telephone set of FIG. 1, left side only being illustrated, showing the rotatable electrical connector of the present invention built into the microphone of the handset, where the telephone cord has an end that either plugs into the connector or is permanently fixed to the rotor assembly of the connector.

In the fourth modification of FIG. 7, the rotatable electrical connector 28 of the present invention is built into the microphone end 20 of the handset 16, and the upper end 46 of the cord 26 is connected permanently with one element of the connector 28, as will best be understood with the description of FIG. 8.

The construction and operation of the preferred embodiment of the low friction rotatable electrical connector 28 of the present invention can best be understood from the exploded perspective view of FIG. 4. There are four main elements in this connector 28; namely, a hollow housing 52 of generally cylindrical form that is molded of insulating material such as Delrin or Teflon, or some equivalent self-lubricating type thermoplastic material. This hollow cylindrical housing 52 is split longitudinally, as in 53, into a lower base portion 54 and an upper cover portion 56; although it will be understood that these parts are defined as upper and lower portions depending upon the orientation of the parts when disassembled. The third main element of this connector is the hollow, cylindrical rotor assembly 58 that is adapted to be mounted within the housing 52 for relative rotation therein. The fourth main element of the connector 28 is the circuit board 60 that is arranged to be mounted in the base portion 54 for supporting the internal circuit elements, to be explained.

The hollow, cylindrical rotor assembly is also a molded part of insulating material, such as Delrin or Teflon. This rotor assembly 58 has a single longitudinal split 66 which extends for nearly the entire length thereof but stops short of the right end 68 so as to form a continuous journal 68 that is adapted to fit within a circular opening 70 in the end wall 72 at the right end 34 of the connector 28. It should be understood that this circular opening 70 is split through the centrally longitudinal split 53 so that the lower half of this opening 70 is in the base portion 54, and the upper half of this opening 70 is in the cover portion 56. Thus, this circular opening serves as a bearing to receive the journal 68 of the rotor assembly 58 for relative rotational movement between the journal and the bearing of low frictional characteristics.

Figure 5:
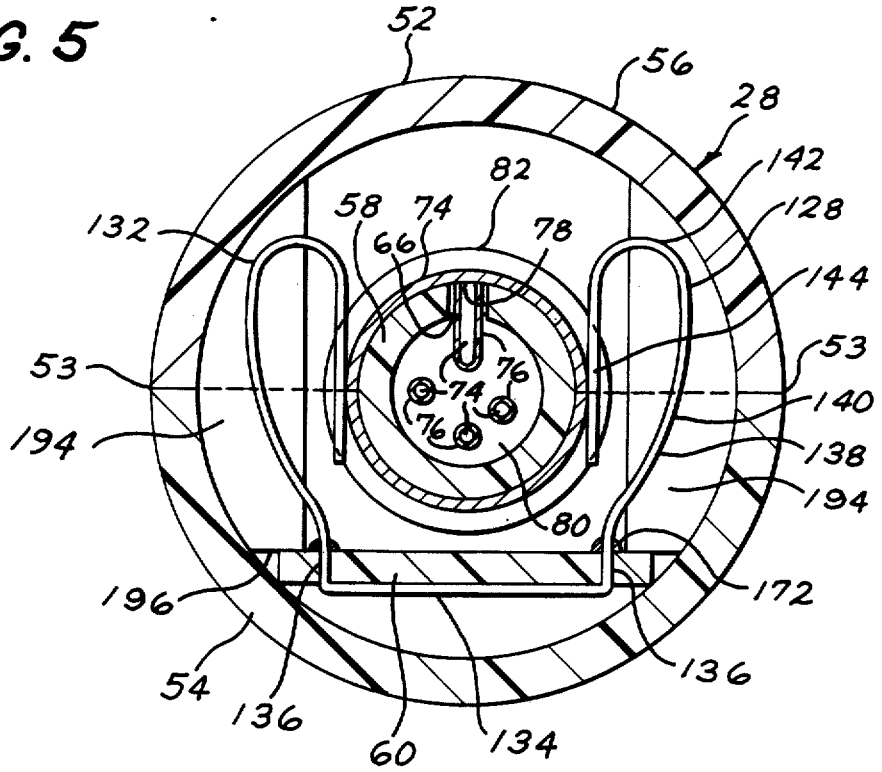
FIG. 5 is a transverse, cross-sectional, elevational view, on an enlarged scale, taken on the Line 5—5 of FIG. 4, through one of the continuous conductive rings that is mounted on the rotor assembly.

This single longitudinal split 66 has a narrow width. A series of four, continuous, conductive rings 74, of copper material or the like are slipped onto the rotor assembly 58 from the left end. In FIG. 4, three of these conductive rings 74 are shown mounted on the rotor assembly 58, while the fourth ring 74 is illustrated spaced from the left end of the rotor assembly and shown by itself so that its construction can be viewed. Each copper ring 74 has soldered to its interior surface a flexible insulated conductor 76, as shown at 78. Each insulated conductor 76 extends first through the split opening and then longitudinally through the center bore 80 lf the hollow, cylindrical rotor assembly 58. Near the soldered connection 78, the conductor 76 is formed at a right angle to extend through the single longitudinal split 66 in the rotor, as is best seen in FIG. 5. These four, continuous, conductive rings 74 must be separated electrically from each other, and this is accomplished by the use of a series of Delrin washer 82. Thus, three washer 82 separate the four conductive rings 74 from each other, and there is an insulating washer 82 at each end of the series of rings for a total of five insulating washers 82, as is shown in FIG. 4. Each insulating washer 82 is provided with an indexing finger 84 on its interior surface, and this finger is adapted to mate within the single longitudinal split 66 which anchors the washer in place and retards relative rotational movement between the washer 82 and the rotor assembly 58, and the washers also tend to clamp the four rings 74 in place so that they are fixed on the rotor assembly.

The left end 90 of the rotor assembly 58 is also formed as a journal for supporting that end of the rotor within the hollow housing 52. The base 54 of the housing is formed with a vertical pillar 92, which is generally parallel with the end wall 72 of the housing, and it is fitted on its top side with a semi-circular bearing 94, which is generally the same as the lower half of the circular opening 70 in the end wall 72, so as to receive the left end journal 90 of the rotor 58 therein. Now, looking at the cover 56 of the housing 52, as seen in FIG. 4, the sidewall has been broken away and shown with cross-hatching to illustrate an inverted piller 96 which has an inverted, semi-circular bearing 98 on its underside to complement the semi-circular bearing 94 and serve in unison as a circular bearing for receiving the journal 90 of the rotor 58.

The right end of the rotor assembly 58 is fitted with a flexible sheath 100 of insulating material for receiving the four insulating conductors 76 therethrough for ultimate connection with a standard male phone plug 36. This sheath 100 would be attached in the end of the center bore 80 of the rotor within the journal 68.

Next to be discussed is the printed circuit board 60 of FIG. 4. It is also of insulating material, and it is of elongated rectangular shape that extends for nearly the entire length of the hollow housing 52. This printed circuit board 60 is designed to the supported within the lower base member 54. The left end wall 30 is furnished with a rectangular opening 106 which leads into a female socket 108 for receiving a standard male phone plug 32, as illustrated in FIG. 1. It should be recognized that the lower half of this rectangular opening 106 is in the base 54, while the upper half of this opening 106 is in the cover 56. Looking at the cover 56, the upper edge of the rectangular opening 106 includes an indexing slot 110 that is adapted to receive the finger-operated locking means (not shown) of a standard male phone plug, as is conventional in this art. The left end 112 of the circuit board 60 is made narrow so that it fits within the opposing sidewalls 114 of the female socket 108. The right end 116 of the circuit board 60 is supported on a horizontal shelf 118 formed on the interior surface of the right end wall 72 of the base 54. Parallel ledges 120 are formed on the opposite sides of the interior of the base 54 adjacent the female socket 108 for supporting the circuit board 60 thereon. The top surface 122 of the circuit board 60 is adapted to be generally flush with the lower edge 124 of the rectangular opening 106 in the end wall 30 in the assembled condition of the connector 28.

This printed circuit board 60 is provided with a first plurality of spring wire contact elements 128 toward the right end of the board for cooperation with the four, continuous, conductive rings 74 of the rotor assembly 58, and a second plurality of spring wire contact elements 130 at the left end of the board so as to be disposed within the female socket 108 and to be in a position to automatically engage with the circuit elements carried by a mating standard male phone plug when it is coupled into the female socket 108.

The first plurality of spring wire contact elements 128 comprises a series of four pairs of parallel, vertical, opposing contact elements, where each pair of contact elements is identified as 132, best illustrated in the transverse, cross-sectional, elevational view of FIG. 5. Each pair of contact elements 132 is formed of a single length of spring wire having a horizontal central section 134 which underlies the circuit board 60. Each end of this central section 134 is turned upwardly, as at 136, to fit through a mating hole in the circuit board. Each vertical section 136 is then formed in a hairpin shape 138 having an outwardly bowed upright 140, which has its upper end formed at a reentrant angle 142 which then terminates as a vertical wiping contact 144 which is opposed to the vertical wiping contact 144 of the opposite contact element of this pair 132 so as to be in continuous wiping action with the continuous conductive ring 74 of the rotor assembly 58. Thus, each pair 132 of contact elements serve as opposing spring members for exerting wiping contact action against the opposite sides of the rings 74 so as to give a balanced effect of pressure exerted upon the rotor assembly as it turns within the housing 52. The objective is to provide equal spring forces exerted against the opposite sides of the ring 74. Thus, it should be appreciated that this first plurality of spring wire contact elements 128 comprises a series of four pairs of opposing, vertical contact elements, where each pair of contact 132 is arranged to be in parallel with the other pairs of elements, as is clear from FIG. 4.

Each pair of opposing, vertical contact elements 132 is provided with its individual printed circuit on the top surface 122 of the circuit board 60. Looking at FIG. 5, the first pair 146 of opposing, vertical contact elements 132 has a printed circuit 148 which starts near the right end 116 of the circuit board and joins the two upright sections 136, which are soldered thereto, and then it extends between the four series of pairs of contact elements 132, then extends along the right side edge of the board and terminates at a vertical hole 150 in the board. The second pair 152 of opposing contact elements 132 has a printed circuit 154 which extends lengthwise of the board and terminates at the vertical hole 156. The third pair 158 of contact elements 132 is provided with a printed circuit 160 which terminates at the vertical hole 162. Finally, the fourth pair 164 is provided with a printed circuit 166 which terminates at the vertical hole 168. It should be understood that each pair of opposing, vertical contact elements 132 must be soldered to their respective printed circuits and that this also serves as a mounting means for the contact elements with the circuit board 60. Suitable metal inserts 170 are arranged along the near side of the circuit board 60 to provide for this solder connection, as at 172.

The second plurality of spring wire contact elements 130 is four in number, where each contact element is generally V-shaped, as seen in a side elevational view looking along the plane of the circuit board 60. The lower leg 178 of the V-shaped wire contact 130 is positioned horizontally against the underside of the circuit board 60, and its free end 180 is turned up slightly to form a vertical terminal that is adapted to fit into a mating hole, either 150, 156, 162 or 168, that is formed at the end of the various printed circuits 148, 154, 160, and 166 respectively, and then soldered in place. The apex 182 of each V-shaped wire contact 130 is adapted to slip into a shallow notch 184 formed in the edge of the circuit board 60 at the left end thereof to help to retain and stabilize this spring wire contact 130 during use. The upper leg 186 of the V-shaped spring wire contact 130 is formed at an acute, inclined angle of about 25 degrees, and it is longer than the lower leg 178. This second plurality of spring wire contact elements 130 is arranged in a vertical, parallel array, but they are closer spaced to each other than the spring wire contact elements of the first plurality 128.

Thus, it will be seen that the right end 34 of the rotatable electrical connector 28 of FIG. 4 is provided with a male phone plug 36, while the left end wall 30 of the connector housing 52 is provided with a female socket 108 for receiving a standard male phone plug 32, all as illustrated in the assembly view of FIG. 1. It will be understood by those skilled in this art that the split housing 52 of the connector formed by the base 54 and the cover 56 must be sealed together during use. Adhesives could be used, or a sonic welding technique to weld the mating surfaces of the single longitudinal split 53. Another alternative would be to use a push-on or a wraparound sleeve over the housing.

The base portion 54 includes a central vertical post 190 that is generally rectangular in top plan view. This post is associated with the vertical pillar 92 to cooperate with a rectangular opening 192 in the center of the circuit board 60 so there is a close-fitting relationship between the vertical post 190 and vertical pillar 92 on the one hand and the rectangular opening 192 in the circuit board on the other hand. Thus, this interaction between the post 190 and pillar 92 with the rectangular opening 192 in the circuit board serves as a precision method of locating the circuit board relative to the housing 52 and the rotor assembly 58. As shown in FIG.

4, the top cover 56 is provided with a plurality of parallel, transverse ribs 192 which are capable of extending down into the base 54, and they have a lower surface 196 which is adapted to seat upon the top surface 122 of the circuit board 60, as is best seen in FIG. 5, for holding the circuit board down on its shelf 118 and the parallel side ledges 120. These parallel, transverse ribs 194 are space apart a slight amount to create an area for receiving one of the spring wire contact elements of the first plurality 128 therebetween so as to stabilize these contact elements and space them apart.

Four, narrow, deep slots 200 are formed vertically in the top end of the post 190, each slot for receiving the free end of the inclined upper leg 186 of the spring wire contact element of the second plurality 130, for retaining and spacing the spring wire contacts apart for increasing the life expectancy of the terminals within the female socket 106 of this rotatable electrical connector 28.

Figure 6:
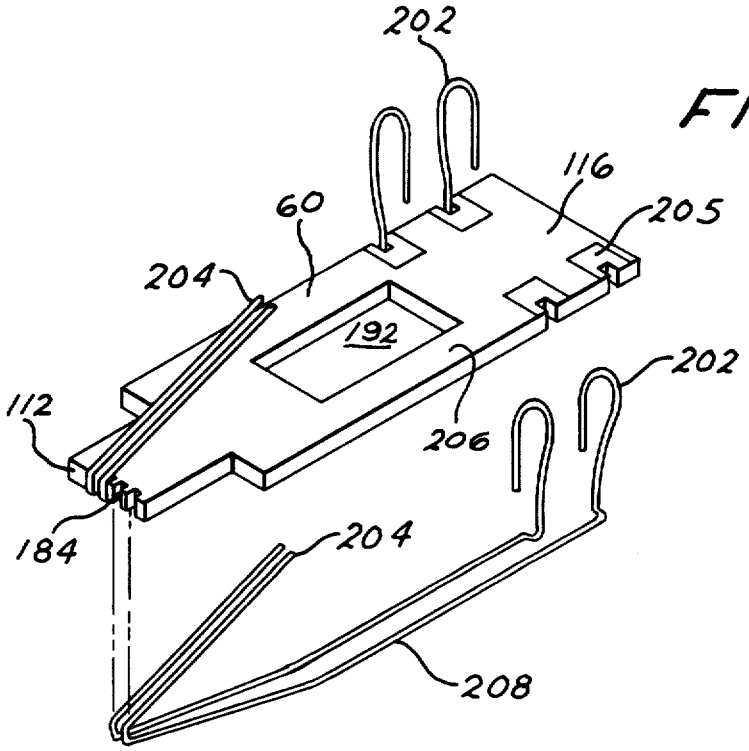
FIG. 6 is a modification of the circuit board that was used in the preferred embodiment of FIG. 4, where the plurality of spring wire contact elements at the right end of the board are integral with the plurality of closely spaced, parallel, spring wire contact elements at the left side of the board.

FIG. 6 shows a modification of the circuit board 60 in that it does not have the printed circuit 148, 154, 160, and 166. Instead, there is a first plurality of spring wire contact elements 202 arranged toward the right end of the circuit board 60, and these are integral with a second plurality of spring wire contact elements 204 that are arranged adjacent the left end of the board to serve as the terminal means for the female socket 108. Remember, in the preferred embodiment of FIG. 4, there was a pair of opposing, vertical contact elements 132, as best seen in FIG. 5. In other words, for four continuous conductive rings 74, there was a total of eight vertical contact elements 128. In this modification of FIG. 6, there is only one spring wire contact element 202 for each continuous conductive ring 74. These wire contact elements 202 are offset from each other; there being two contact elements at the near side of the board and two contact elements at the far side of the bard. Notice the metal inserts 205 formed on the top surface 206 of the circuit board 60 which cooperate with the base of the wire contact elements 202 so that a soldered connection can be made therebetween. An extension 208 connects the lower end of the wire contact element 202 to the lower end of the contact element 204. This extension 208 extends along the underside of the circuit board 60 in the modification of FIG. 6.

FIG. 8 shows another modification of the rotatable electrical connector 28. The hollow housing 52 is split longitudinally, generally through the center thereof, so as to form a lower base portion 212 and an upper cover portioin 214. The left end wall 216 of the housing has a circular opening 218, half in the base and half in the cover. The right end wall 220 of the housing has a similar circular opening 222, where both openings serve as bearings to receive the journals 224 and 226 on the opposite ends of the rotor assembly 228, which is basically the same as the rotor assembly 58 of the preferred embodiment of FIG. 4. One difference is that one end of the rotor assembly 228 is furnished with one end 46 of a coiled telephone cord 26 so that the rotor assembly is fixed with relation to this cord end 46. This rotor assembly 228 includes the single longitudinal split 66 and the plurality of four continuous conductive rings 74 which are separated by the plurality of insulating washers 82, as was described earlier with relation to FIG. 4.

Looking at the base portion 212, it is molded with a plurality of spring wire contact elements 232, which comprise a series of four pairs of opposing, vertical contact elements 234, where each contact element of a pair is in the form of a hairpin shape 236, each having an outwardly bowed upright 238 formed with a top portion at a reentrant angle 240 with a downwardly extending vertical wiping contact 242 for engagement against the side of the continuous conductive ring 74. The lower end of the pair of opposing spring wire contact elements 234 is molded into the base portion 212, as clearly shown in FIG. 8, and the wire is brought together in a single terminal 244 for each pair of opposing contact elements 234, and each single terminal is provided with a sleeve 246, where all four terminals 246 are arranged in a parallel array at the near side of the base 212. Thus, a push-on connection can be made between these terminals 246 of the connector 28 and the internal circuits within the handset 16, as shown in FIG. 7. This particular rotatable electrical connector 28 of FIG. 8 having molded spring wire contact elements 232 into the base 212 is of the type that would be built into the microphone section 20 of the handset 16. Thus, this molded construction eliminates the circuit board 60 of the modifications of FIGS. 4 and 6, and it also eliminates the need for the female socket 108 of FIG. 4 or the male phone plug 36 of FIG. 4.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A low friction rotatable electrical connector for use with a coiled telephone cord, said connector comprising:

a. a hollow insulated housing of generally cylindrical form that is split longitudinally into a base portion and a cover portion, and assembly means for holding the base and cover portions together, and a circular opening in at least one end wall of the cylindrical housing;

b. and a cylindrical rotor assembly of insulating material having a journal at one end that is rotatably mounted within the said circular opening so the rotor assembly may rotate freely relative to the hollow housing, the rotor assembly being a hollow cylindrical member having a single longitudinal split in the wall of the cylinder;

c. a plurality of continuous conductive rings mounted along the length of the rotor assembly and separated by a plurality of insulating washers, where there is a washer positioned between each adjacent pair of conductive rings to serve as a spacer between the rings, each conductive ring including a separate insulating conductor on the underside thereof for extending through the longitudinal split of the rotor extending out from the rotor through the hollow journal to an external termination means;

d. a plurality of spring wire contact elements mounted within the said base portion of the housing in a parallel array, each spring wire contact element having a portion biased into continuous wiping contact with one of the said continuous conductive rings for making a reliable electrical connection between the relatively movable hollow housing and its rotor assembly;

e. each of said plurality of spring wire contact elements being of hairpin shape, the said cover portion of the connector housing having a plurality of partitions to provide means to stabilize and space the contact elements apart[.]; *f. the plurality of spring wire contact elements has one group extending vertically upwardly from the base portion to be at one side of said rotor assembly and a second group extending vertically upwardly from the base portion to be at the opposite side of said rotor assembly, so that said rotor assembly is positioned between the two groups of spring wire contact elements when the connector is assembled; and,*

*g. the two groups of spring wire contact elements are formed by a series of common pairs of spring wire contact elements, where each common pair of contact elements engages a separate one of said continuous conductive rings on the opposite sides thereof.*

[2. The invention as recited in claim 1 wherein the said plurality of spring wire contact elements has one group extending vertically upward from the base portion to be at one side of the rotor assembly and a second group extending vertically upward from the base portion to be at the opposite side of the rotor assembly, so that the said rotor assembly is positioned between the two groups of spring wire contact elements when the connector is assembled.]

[3. The invention as recited in claim 2 wherein the said two groups of spring wire contact elements are formed by a series of common pairs of spring wire contact elements, where each common pair of contact elements enagages a separate one of the said continuous conductive rings on the opposite sides thereof.]

4. The invention as recited in claim [3] *1* wherein the single longitudinal split in the wall of the cylindrical hollow rotor stops short of the said journal so that the journal is unbroken.

5. The invention as recited in claim 4 wherein each spring wire contact element is of hairpin shape, having an outwardly bowed upright section, where the top of the contact element is formed at an reentrant angle that extends downwardly as a vertical wiping contact portion for engaging the side of one of the continuous conductive rings, wherein the spring wire contact elements exert substantially equal opposing forces against the opposite sides of the conductive rings to provide a balanced rotating assemblage.

6. The invention as recited in claim 5 wherein the said rotor assembly is furnished with a journal on both opposite ends thereof.

7. The invention as recited in claim 6 wherein a bearing is formed intermediate the length of the connector housing to support the innermost journal therein.

8. The invention as recited in claim 6 wherein the opposite end wall of the connector housing has a circular opening aligned with the circular opening in the other end of the housing for supporting the two journals of the rotor assembly within the circular bearings of these two end walls, the said plurality of spring wire contact elements being molded into the base portion of the housing, where each common pair of contact elements is provided with external terminal means extending through a sidewall of the base portion.

9. The invention as recited in claim 7 wherein a circuit board means is mounted within the said connector housing having a circuit element for cooperation with each opposing pair of spring wire contact elements, said circuit elements being joined to a second plurality of spring wire contact elements at one end of the connector housing that is opposite the said end wall that includes the circular bearing for receiving the journal of the rotor assembly, where this second plurality of spring wire contact elements serve as terminal means within a female socket built into that end of the connector housing for receiving a male phone plug therein.

10. The invention as recited in claim 9 wherein the said partitions formed in the top cover portion of the connector housing extend downwardly into the lower base portion and engage the top surface of the circuit board for holding the circuit board firmly in place in the assembled condition of the connector.

11. A low friction rotatable electrical connector for use with a coiled telephone cord, said connector comprising:

a. a hollow insulated housing of generally cylindrical form that is split longitudinally into a base portion and a cover portion, and assembly means for holding the base and cover portions together;

b. and a hollow cylindrical rotor assembly of insulating material having a journal at each opposite end for supporting the rotor assembly within the said housing for freedom of relative rotational movement therebetween about a central longitudinal axis, the rotor assembly having a longitudinal slot in the wall thereof;

c. a plurality of continuous conductive rings mounted along the length of the rotor assembly, and separator means for spacing them apart from each other, each conductive ring having a separate insulated conductor integral therewith on the underside thereof and extending through the said longitudinal slot, and each conductor extending out one end of the rotor assembly and adapted for connection between the rotor assembly rings and a standard phone conductor;

d. a plurality of spring wire contact elements mounted within the said base portion of the housing in a vertical parallel array, each spring wire contact element being of hairpin shape having a free end portion biased into continuous wiping contact with one of the said conductive rings for making a reliable electrical connection between the relatively movable housing and rotor assembly, one-half of the spring wire contacts being on the two opposite of the rotor assembly to balance the spring forces acting upon the rotor assembly, the said spring wire contact elements having terminal means that cooperate together for joining the housing contacts to a standard phone connector;

e. the said cover portion of the housing having partition means extending between adjacent spring wire contact elements to both stabilize the contacts and space them apart[.]; *and,*

*f. the opposite end wall of the hollow housing has a circular opening for receiving the second journal of the rotor assembly.*

12. The invention as recited in claim 11 wherein there are four continuous conductive rings mounted on the rotor assembly, and there is an opposing pair of spring wire contact elements wiping each conductive ring, where each opposing pair of contact elements is joined together to be in common with each other and having a single terminal means.

13. The invention as recited in claim 11 where there is but a single spring wire contact element in wiping contact with each continuous conductive ring, where adjacent rings are furnished with spring wire contacts on opposite sides of the rotor assembly.

14. The invention as recited in claim 11 wherein one end wall of the cylindrical housing is furnished with a circular opening for receiving the journal of the rotor assembly therein, the housing having a bearing intermediate the length thereof for receiving the second journal of the rotor assembly therein.

[15. The invneition as recited in claim 11 wherein the opposite end wall of the hollow housing has a circular opening for receiving the second journal of the rotor assembly.]

16. The invention as recited in claim 11 wherein the said plurality of spring wire contact elements that are mounted in the base portion is supported therein on a circuit board that is clamped in place by the cover portion of the housing.

17. The invention as recited in claim 11 wherein the said plurality of spring wire contact elements has fixed ends that are molded into the said base portion of the housing, and these said spring wire contact elements have terminal means that extend out through a sidewall of the base portion for joining to a phone connector.

*18. A low friction rotatable connector for use with a coiled telephone cord, comprising:*

*a) a housing comprised of an insulating material and having an opening extending therethrough between a first end and a second end;*

*b) an insert comprised of insulating material positioned in said housing;*

*c) a rotor assembly comprised of an insulating material journaled in said housing for permitting rotation of said housing relative to said rotor assembly;*

*d) a plurality of longitudinally spaced apart conductor means disposed about said rotor assembly;*

*e) first circuit means extending from said rotor assembly, said first circuit means including a plurality of first circuit elements and each of said first circuit elements in circuit connection with one of said conductor means;*

*f) a plurality of resilient contact means associated with and extending from said insert, each of said contact means wipingly engaged with one of said conductor means for maintaining circuit connection therewith;*

*g) second circuit means disposed in said housing, said second circuit means including a plurality of second circuit elements and each of said second circuit elements in circuit connection with one of said contact means and one of said circuit means for connection with a telephone handset and the other of said circuit means for connection with a telephone base for maintaining a continuous circuit between the handset and the base;*

*h) said conductor means being disposed proximate one of said ends; and,*

*i) each of said contact means including a first portion in wiping contact with the associated conductor means and a second portion extending therefrom to the other of said ends.*

*19. The connector of claim 18, wherein:*

*a) said insert including a generally planar portion with a first and a second surface and said insert extending substantially between said first and second ends; and,*

*b) said first portions being disposed proximate said first surface and said second portions being disposed substantially along said second surface.*

*20. The connector of claim 19, wherein:*

*a) each of said second portions including an apex proximate said second end from which a third portion comprising a second circuit element extends above said first surface.*

*21. The connector of claim 18, wherein:*

*a) each of said first portions including a hairpin element for maintaining wiping contact with the associated conductor means.*

*22. The connector of claim 21, wherein:*

*a) there being at least four connector means and at least one contact means for each conductor means;*

*b) said rotor assembly being centrally positioned relative to said insert for dividing said insert into first and second side portions; and,*

*c) said contact means first portion being disposed along said side portions so that an equal number of contact means are positioned along said first and second side portions.*

*23. The connector of claim 22, wherein:*

*a) said rotor assembly being disposed above said first surface.*

*24. The connector of claim 20, wherein:*

*a) means being associated with said insert engageable with each of said third portions for maintaining positioning of said third portions and preventing contact therebetween.*

*25. The connector of claim 18, wherein:*

*a) said rotor assembly including aperture means extending therethrough; and,*

*b) said first circuit elements each including a portion extending through said aperture means.*

*26. The connector of claim 18, wherein:*

*a) said rotor assembly including a cylindrical portion disposed within said housing;*

*b) a plurality of annular recesses being disposed in said spaced longitudinal relation along said cylindrical portion; and,*

*c) each of said conductor means being positioned in one of said recesses so that adjacent conductor means are separated by an insulating element.*

*27. The connector of claim 26, wherein:*

*a) said conductor mean each being annular in plan and having an outer diameter less than the outer diameter of said cylindrical portion whereby said insulating elements position said contact means and prevent contact between adjacent contact means; and,*

*b) said conductor means rotating on the axis of said rotor assembly.*

*28. The connector of claim 19, wherein:*

*a) means being associated with said housing for maintaining said insert in said housing and for positioning said insert relative to said rotor assembly.*

*29. The connector of claim 27, wherein:*

*a) means being associated with each of said conductor means for preventing rotation thereof relative to said rotor assembly.*

*30. The connector of claim 23, wherein:*

*a) said rotor assembly being rotatable on an axis disposed centrally of said housing.*

*31. The connector of claim 27, wherein:*

*a) said conductor means and said contact means being comprised of a solderable copper containing material.*

*32. The connector of claim 18, wherein:*

*a) said first circuit means including a male plug portion; and,*

*b) said second circuit means including a female receptacle portion.*

*33. The connector of claim 32, wherein:*

*a) means being operably associated with said insert for journaling said rotor assembly.*

*34. The connector of claim 18, wherein:*

*a) said contact means and said second circuit means being integral.*

*35. A low friction rotatable electrical connector for use with a coiled telephone cord, comprising:*

*a) a housing comprised of an insulating material and having an opening extending therethrough between a first end and a second end;*

*b) a generally cylindrical rotor assembly comprised of an insulating material journaled in said housing first end and permitting rotation of said rotor assembly relative to said housing;*

*c) a plurality of longitudinally spaced apart conductor means disposed about said rotor assembly and rotatable therewith;*

*d) first circuit means extending from said rotor assembly, said first circuit means including a plurality of first circuit elements and each first circuit element having a portion in circuit connection with one of said conductor means;*

*e) a plurality of resilient contact means positioned in said housing and each contact means having a first portion in wiping contact with one of said conductor means for maintaining circuit connection therewith;*

*f) said contact means including circuit means extending towards said second end and said second circuit means including a plurality of second circuit elements and each of said second circuit elements in circuit connection with one of said contact means and one of said circuit means for connection with a telephone handset and the other of said circuit means for connection with a telephone base so that a continuous circuit is maintained between the handset and the base;*

*g) said conductor means being disposed proximate said first end;*

*h) said contact means including a second portion disposed proximate said second end;*

*i) each second portion terminating in an apex proximate said second end; and,*

*j) a third portion comprising a second circuit element extending from said apex angularly disposed to the axis of said rotor assembly.*

*36. The connector of claim 35, wherein:*

*a) a plurality of recesses disposed about said rotor assembly and said recesses being longitudinally spaced apart by an insulating element; and,*

*b) each of said conductor means being mounted in one of said recesses and said conductor means each being annular in plan and having an outer diameter less than the outer diameter of said rotor assembly so that the insulating element between adjacent recesses positions said contact means apart and prevents contact between adjacent contact means.*

*37. The connector of claim 25, wherein:*

*a) each contact means first portion being disposed generally transverse to the longitudinal axis of said rotor assembly and said second portion extending generally parallel to the axis of said rotor assembly.*

*38. The connector of claim 35, wherein:*

*a) each first portion including a hairpin having a portion in wiping engagement with the associated conductor means.*

*39. The connector of claim 35, wherein:*

*a) said rotor assembly being centrally positioned in said housing and dividing said housing into first and second housing portions; and,*

*b) each of said first portions being positioned in one of said housing portions and there being an equal number of first portions in each housing portion for maintaining said rotor assembly centrally of said housing.*

*40. The connector of claim 35, wherein:*

*a) said rotor assembly including central aperture means; and,*

*b) said first circuit means including a portion extending through said aperture means.*

*41. The connector of claim 40, wherein:*

*a) said first circuit means including a male plug portion; and,*

*b) said second circuit means including a female socket portion.*

*42. The connector of claim 35, further comprising:*

*a) an insert being removably positioned in said housing and extending substantially between said ends;*

*b) said contact means extending along said insert; and,*

*c) means being operably associated with said insert for journaling said rotor assembly.*

*43. The connector of claim 42, wherein:*

*a) said insert having a substantially planar surface and said first portion extending generally perpendicular to said surface.*

*44. The connector of claim 43, wherein:*

*a) means being associated with said housing for maintaining said insert in a preselected position; and,*

*b) the longitudinal axis of said rotor assembly extending parallel to and spaced from said surface.*

*45. The connector of claim 43, wherein:*

*a) said contact means each including a second portion extending along said surface and terminating in an apex proximate said second end; and,*

*b) a third contact portion comprising a second circuit element extending from said apex at an acute angle to said surface and being disposed adjacent a second surface of said insert parallel to said first mentioned surface.*

*46. The connector of claim 45, wherein:*

*a) said insert including an end wall portion proximate said second end; and,*

*b) a plurality of grooves being disposed in said end wall, each of said apexes being received in one of said grooves for maintaining said contact means apart.*

*47. The connector of claim 45, wherein:*

*a) means being associated with said insert for receiving said third portions and for maintaining said third portions spaced apart and for permitting said third portions to flex.*

*48. The connector of claim 35, wherein:*

*a) said rotor assembly including a portion extending coaxially from said conductor means; and,*

*b) means being positioned in said housing for rotatably receiving said coaxial portion and thereby permitting rotation of said housing relative to said rotor assembly.*

*49. The connector of claim 35, wherein:*

*a) said contact means and said second circuit means being integral.*

* * * * *